United States Patent
Smith et al.

(10) Patent No.: US 11,246,402 B1
(45) Date of Patent: Feb. 15, 2022

(54) FRAYED CABLE SCALING TOOL

(71) Applicants: Ian Richard Smith, Sandisfield, MA (US); Edward Herbert, Canton, CT (US)

(72) Inventors: Ian Richard Smith, Sandisfield, MA (US); Edward Herbert, Canton, CT (US)

( * ) Notice: Subject to any disclaimer, the term of this patent is extended or adjusted under 35 U.S.C. 154(b) by 0 days.

(21) Appl. No.: 17/207,474

(22) Filed: Mar. 19, 2021

(51) Int. Cl.
| | | |
|---|---|---|
| *A46B 13/02* | (2006.01) | |
| *A46B 3/10* | (2006.01) | |
| *A46B 3/02* | (2006.01) | |
| *A46B 3/06* | (2006.01) | |
| *B25F 3/00* | (2006.01) | |
| *A46B 3/16* | (2006.01) | |
| *A46B 9/02* | (2006.01) | |
| *A46D 1/00* | (2006.01) | |
| *B23D 51/10* | (2006.01) | |

(52) U.S. Cl.
CPC ............ *A46B 13/02* (2013.01); *A46B 3/02* (2013.01); *A46B 3/06* (2013.01); *A46B 3/10* (2013.01); *A46B 3/16* (2013.01); *A46B 9/026* (2013.01); *A46D 1/0207* (2013.01); *B25F 3/00* (2013.01); *A46B 2200/3013* (2013.01); *A46B 2200/3093* (2013.01); *B23D 51/10* (2013.01)

(58) Field of Classification Search
CPC .. A46B 13/02; A46B 3/02; A46B 3/06; A46B 3/10; A46B 3/16; A46B 9/026; A46B 2200/3013; A46B 2200/3093; A46D 1/0207; B25F 3/00; B23D 51/10
See application file for complete search history.

(56) References Cited

U.S. PATENT DOCUMENTS

| | | | | |
|---|---|---|---|---|
| 1,663,194 A | * | 3/1928 | Denman | E21B 37/02 15/200 |
| 1,920,283 A | * | 8/1933 | Vroom | A46B 5/00 15/104.2 |
| 2,147,682 A | * | 2/1939 | Vroom | A46B 5/02 15/104.2 |
| 2,687,178 A | * | 8/1954 | Atkinson | E21B 37/02 166/173 |
| 2,787,328 A | * | 4/1957 | Atkinson | E21B 37/02 166/173 |
| 2,968,352 A | * | 1/1961 | Hene | E21B 37/02 166/173 |
| 3,314,095 A | * | 4/1967 | Prange | E03F 9/002 15/104.2 |
| 3,827,492 A | * | 8/1974 | Hammon | E21B 37/02 166/173 |

(Continued)

FOREIGN PATENT DOCUMENTS

| | | | | |
|---|---|---|---|---|
| DE | 9214144 U1 | * | 12/1992 | ............... A46B 3/10 |
| JP | 10165912 A | * | 6/1998 | ........... B08B 9/0497 |

*Primary Examiner* — Marc Carlson

(57) ABSTRACT

A frayed cable scaling tool is made by fraying the end of a cable so that it forms a wire brush. A collar or other way of keeping the cable from unraveling too much is necessary. When powered by a pneumatic saw power tool, the scaling tool is very effective at removing scale, rust, carbon, or other debris. The flexibility of the cable allows the frayed end of the cable to move vigorously in a random motion, which is effective for scrubbing. For some applications, it is preferred to enclose the cable and/or the collar in a guide tube.

20 Claims, 10 Drawing Sheets

(56) References Cited

U.S. PATENT DOCUMENTS

| | | | | |
|---|---|---|---|---|
| 4,501,322 | A * | 2/1985 | Martin | E21B 37/02 15/104.2 |
| 4,612,986 | A * | 9/1986 | Fosdick, Jr | E21B 37/08 15/104.2 |
| 5,540,004 | A * | 7/1996 | Patterson | A46B 13/001 15/55 |
| 5,871,589 | A * | 2/1999 | Hedge | F41A 29/02 134/8 |
| 6,237,179 | B1 * | 5/2001 | Balceiro | A46B 7/04 15/22.1 |
| 2004/0221405 | A1 * | 11/2004 | Manfredi | A46B 13/02 15/22.2 |
| 2010/0154153 | A1 * | 6/2010 | Hooper | A46B 3/10 15/104.05 |
| 2012/0023689 | A1 * | 2/2012 | Weinberger | A47J 37/0786 15/111 |
| 2016/0223282 | A1 * | 8/2016 | Brooker | F41A 29/02 |

\* cited by examiner

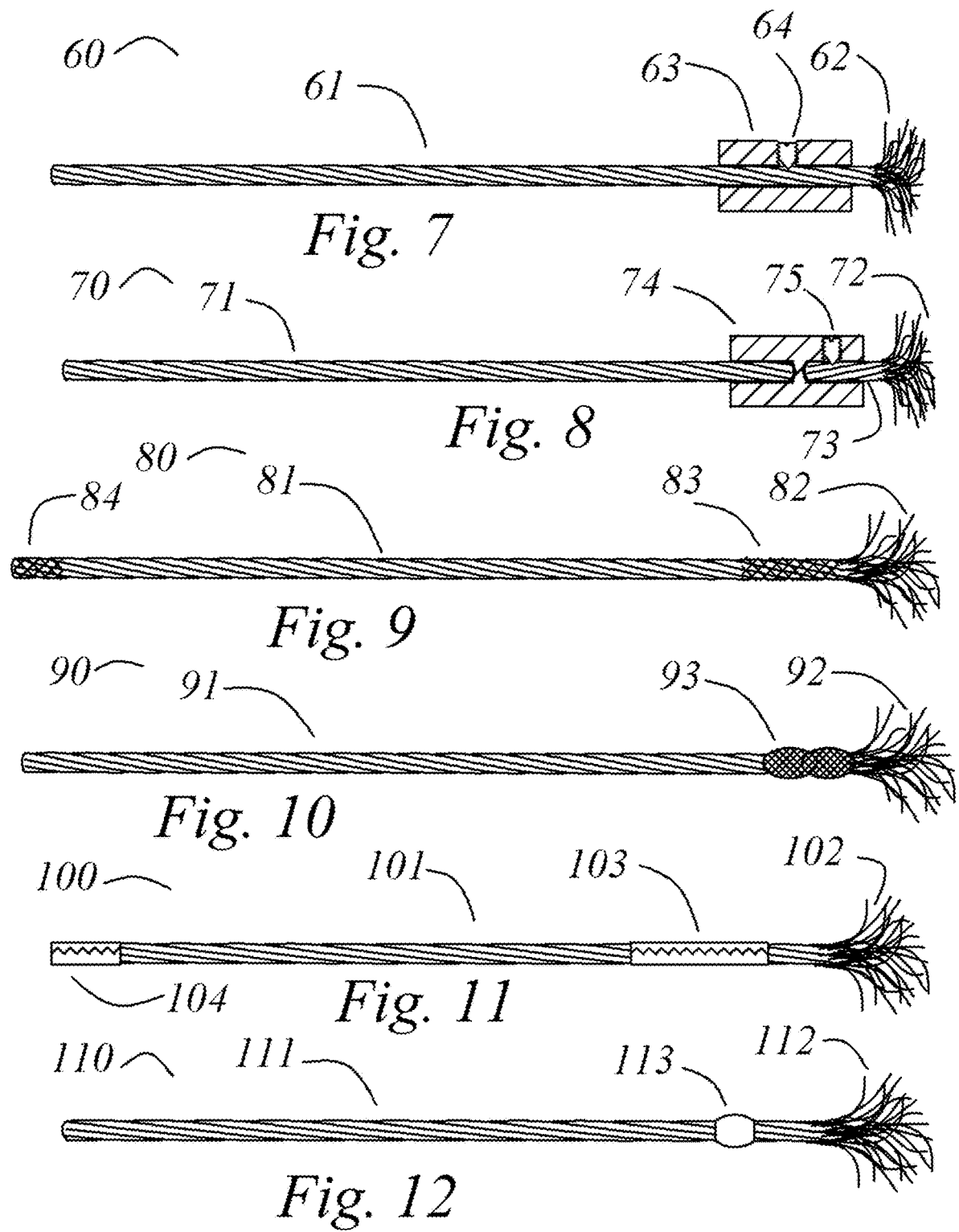

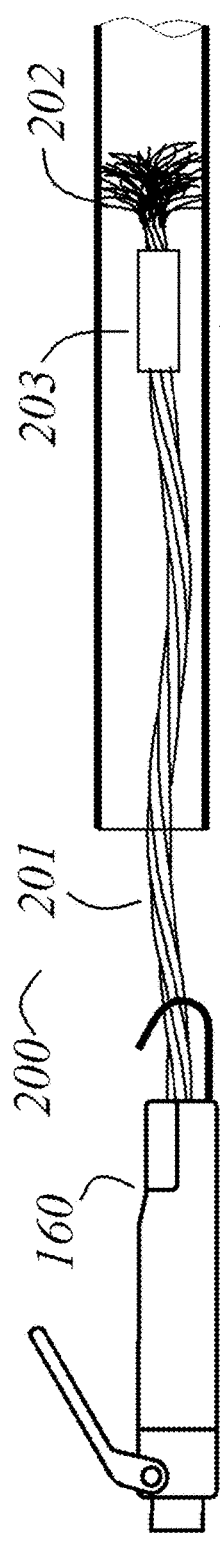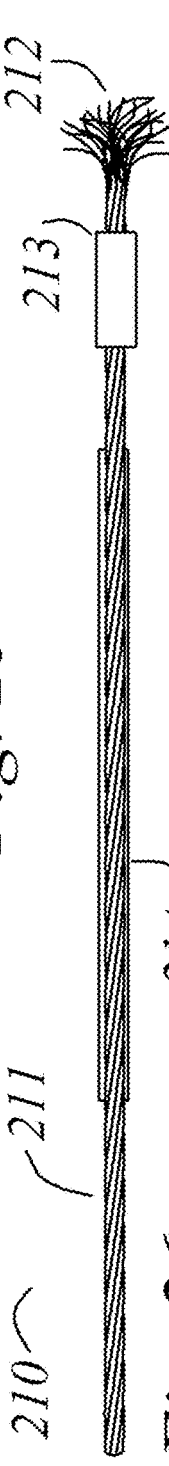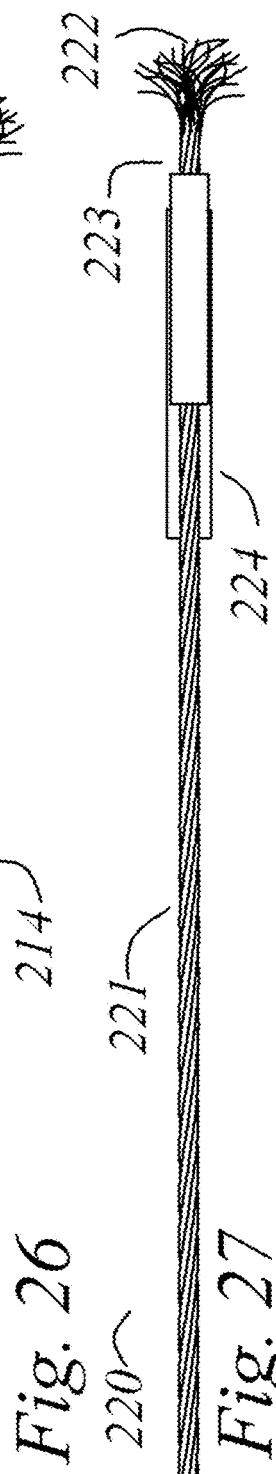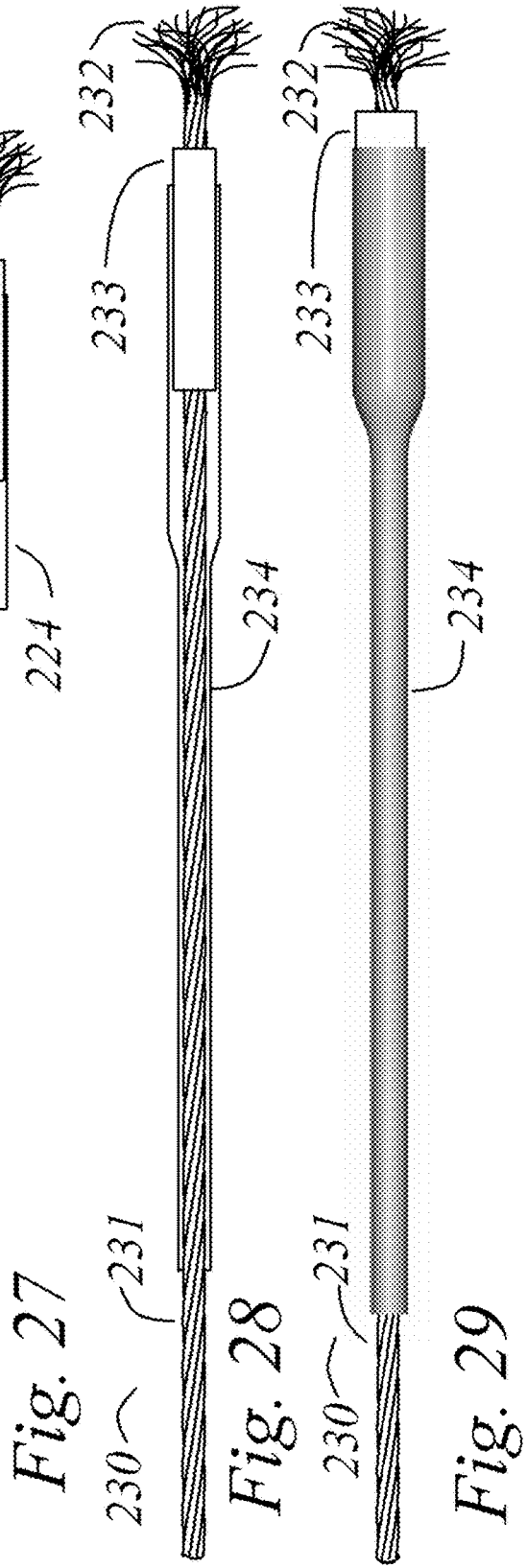

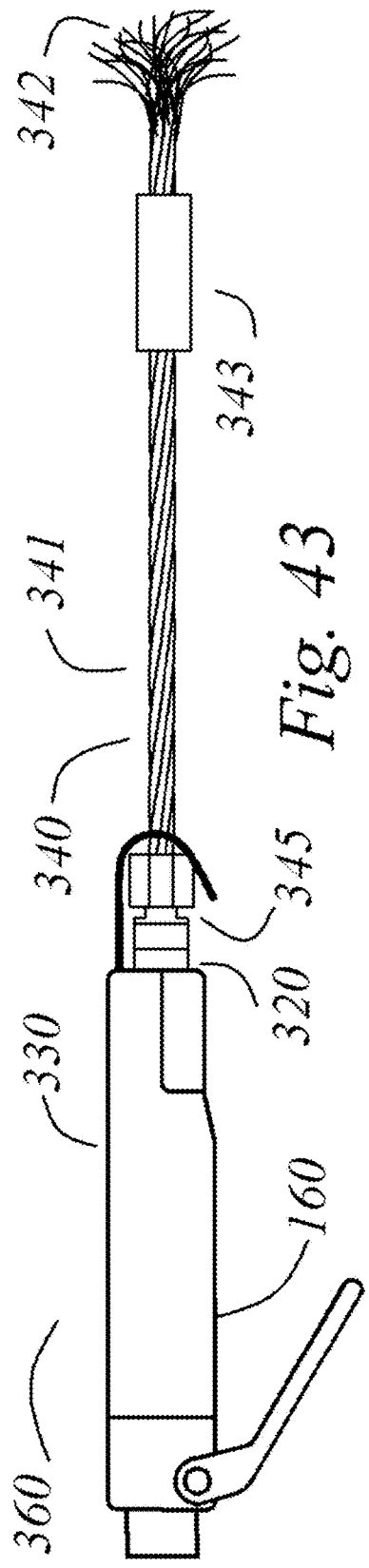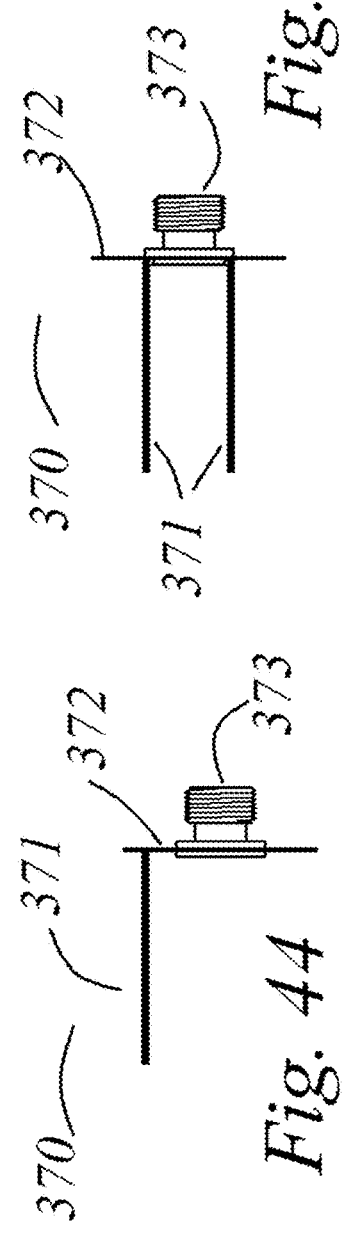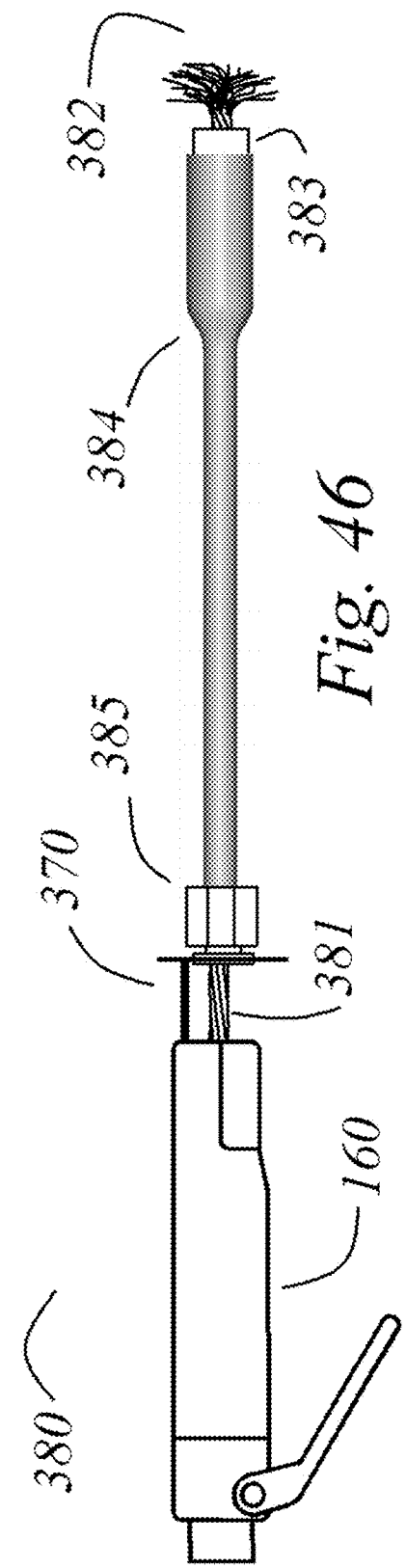

FRAYED CABLE SCALING TOOL

BACKGROUND OF THE INVENTION

Often, there is a need to clean scale or similar debris such as rust, paint, accumulated carbon, smeared masonry or grout, or other surface dirt from a surface. One particularly challenging need is decarbonizing the input port in the head of an internal combustion engine after many miles of use. Wire brushes and solvents do not work well. Sometimes the input port is blasted with ground walnut shells, a messy operation that has limitations and requires specialized equipment.

SUMMARY OF THE INVENTION

This invention teaches that the end of a wire cable can be frayed into a wire brush and that this is an effective tool for scaling a surface. The frayed end of the cable can be used with a pneumatic reciprocating power tool such as is often used for a saw. These tools reciprocate at a rate up to 10,000 strokes per minute. The frayed end of the cable tends to oscillate vigorously, pounding and scrubbing the surface against which it is directed. In a cavity, such as the input port in the head of an internal combustion engine, the frayed end of the cable bounces and ricochets around randomly scrubbing all of the interior surface as it is moved in and out.

A collar or other means is needed to keep the cable from fraying too much. The collar usually is fitted to the cable a centimeter or two from the end of the cable, then the end of the cable is frayed. The end of the cable can be put on an anvil and hit repeatedly with a hammer, or it can be pinched and twisted with pliers, or it can be prodded with a sharp instrument such as an awl.

This invention further teaches that the frayed end of the cable can be shaped in different ways for different applications. The collar can be shaped differently for different applications and may be coated with a rubbery coating. The weight of the collar affects the way that the frayed end moves when reciprocated. In one embodiment of the invention, the collar is a splice so that the bulk of the cable can be of one material and the frayed end can be of a different material.

This invention further teaches that the cable and/or the collar can be guided within a guide tube.

BRIEF DESCRIPTION OF THE FIGURES

FIGS. 7 through 17 show various means for preventing the cable from unraveling more than is desired.

FIG. 25 shows a frayed cable scaling tool being used to clean the inside surface of a tube. The cable is shown oscillating.

FIGS. 26 through 37 show various configurations of a guide tube used to guide the cable and/or the collar.

FIGS. 42 and 43 show a frayed cable scaling tool installed in the adapter.

FIGS. 44 and 45 show an adapter to fix a guide tube to the pneumatic reciprocating power tool. The adapter is to be installed where the guard normally would be.

FIG. 46 shows a frayed cable scaling tool with a guide tube that is installed in the adapter.

DETAILED DESCRIPTION

Figure 1:
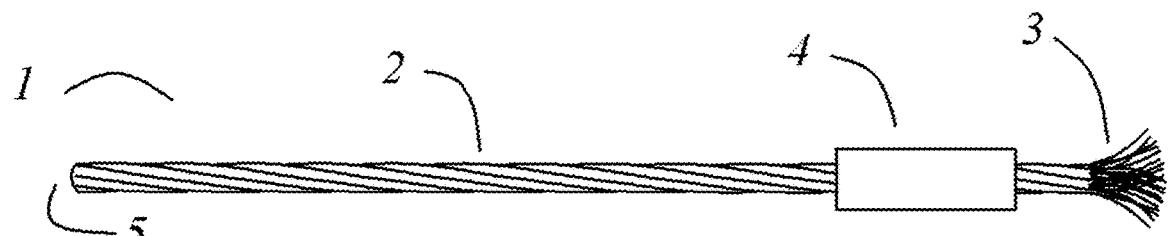
FIG. 1 shows a representative frayed cable scaling tool.

FIG. 1 shows a frayed cable scaling tool 1 comprising a cable 2. The cable 2 has a frayed end 3 on a first end of the cable 2 where the strands of the cable 2 have been unraveled to form a wire brush. A first means for preventing unraveling of the cable 2 comprises a collar 4 that is crimped on the cable 2 near the frayed end 3 so that the cable 2 does not continue to unravel in use. The collar 4 also increases the inertia of the cable 2 at the frayed end 3, which may enhance the effectiveness of the frayed end 3 as a scaling tool.

Webster's Seventh New Collegiate Dictionary defines "collar" as "2. Something resembling a collar in shape or use (as a ring or round flange to restrain motion or hold something in place)." There are other meanings, but this one best fits the application.

More useful definitions can be found on-line. Oxford Languages: "2. A restraining or connecting band, ring, or pipe in machinery." Your Dictionary: "Any or various ring-like devices used to limit, guide or secure a machine part." Oxford Lexicon: "A restraining or connecting band, ring or pipe in machinery."

A second end of the cable 2 may have a second means for preventing unraveling comprising an optional bonded end 5 to prevent unraveling of the cable 2 at the second end. One way of forming the bonded end 5 is to cut the cable 2 with an oxyacetylene cutting torch. The cable 2 can be difficult to cut, and an oxyacetylene cutting torch is effective and has the added benefit that the ends of the cable 2 adjacent to the cut are fused to form a bonded end 5 that will not unravel.

To make the frayed end 3, a number of methods can be used, as examples, not limitations. One is to put the end of the cable on an anvil and tap it repeatedly with a hammer. Another is to squeeze and twist it with pliers. Another is simply to put it in a reciprocating tool and let it pound against a hard surface. Another is to dig at it with an awl or other sharp pointed tool. Other methods can be used. Automated methods of unraveling the cable can be used for larger scale production.

To use the frayed cable scaling tool 1, the second end of the cable 2, opposite the frayed end 3, may be clamped into a reciprocating tool such as a modified pneumatic reciprocating power tool as may be used for a saw, as an example, not a limitation. This is described in more detail following. A pneumatic reciprocating power tool reciprocates with a rate claimed to be as much as 10,000 strokes per minute, though this number probably is reduced with higher inertia loads such as the frayed cable scaling tool 1.

As the pneumatic reciprocating power tool drives the frayed cable scaling tool 1, the frayed end 3 pounds against a surface to be scaled, effectively removing surface debris such as rust, paint, accumulated carbon, smeared masonry or grout, or other surface dirt, as examples, not limitations.

Figure 2:
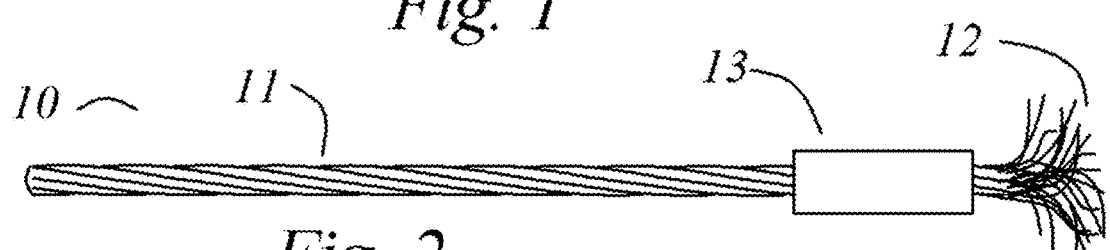
FIGS. 2 through 6 show alternative shapes that the frayed end can be formed.

FIG. 2 shows another frayed cable scaling tool 10 comprising a cable 11 having a frayed end 12. A means for preventing unraveling of the cable 10 comprises a collar 13. The collar 13 is crimped to the cable 11 so that the cable 11 does not unravel more than desired. The frayed end 12 is formed as a wire brush, but it can be seen that the wires of the wire brush are more spread out than in the frayed end 3 of FIG. 1. This may be a choice of how the frayed ends 3 and 12 are formed when the respective frayed cable scaling tools 1 and 10 are made, but the shape of the frayed end 12 of FIG. 2 is also a natural consequence of using the frayed cable scaling tool 1 of FIG. 1. As the frayed end 3 pounds against a surface to be cleaned, the strands of the frayed end 3 tend to deform over time and spread out into a mushroom shape like the frayed end 12 of FIG. 2.

This evolution of the shape of the frayed end 3 to take the shape of the frayed end 12 as it is used is useful for some applications such as cleaning out a cavity in a casting, such as an inlet port of a head of an internal combustion engine, as an example, not a limitation. When new and first used, the frayed cable scaling tool 1 of FIG. 1 is better for scaling the end of the cavity. As the frayed end 3 evolves through use to take the shape of the frayed end 12, the frayed cable scaling tool 10 become less effective at scaling the end of the cavity but it becomes more effective at scaling the sides of the cavity.

Figure 3:
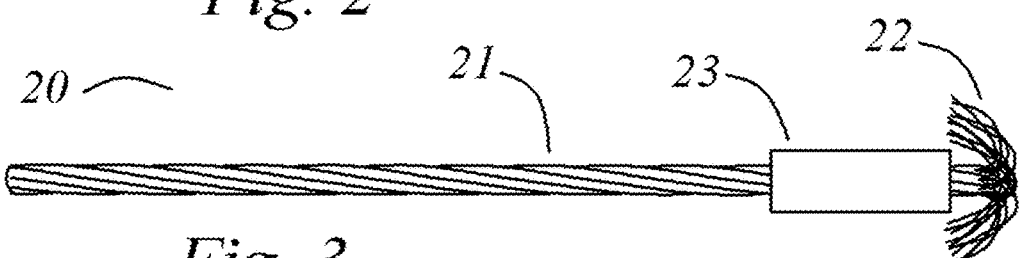

FIG. 3 shows a frayed cable scaling tool 20 having a cable 21 with a frayed end 22 in which the unraveled strands of the cable 21 are bent back, individually as a "U" shape and collectively as an umbrella shape. A means for preventing unraveling of the cable 20 comprises a collar 23. The collar 23 keeps the cable 21 from unraveling more than is intended. The umbrella shaped frayed end 22 is useful for cleaning the back side of a projection into a cavity, such as a valve stem and a valve guide in an input port in a head of an internal combustion engine, as an example, not a limitation.

Figure 4:
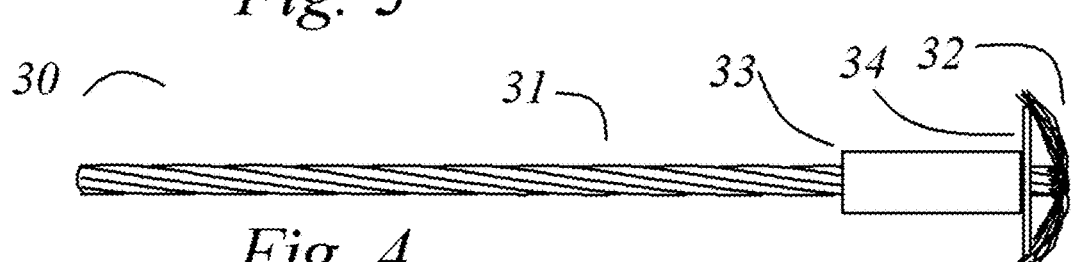

FIG. 4 shows a frayed cable scaling tool 30 having a cable 31. A frayed end 32 of the cable 31 is formed in an umbrella shape as is the frayed end 22 of FIG. 3. A means for preventing unraveling of the cable 30 comprises a collar 33. The collar 33 prevents the cable 31 from unraveling more than desired in use. The frayed end 32 of the cable 31 is reinforced by a washer 34. The washer 34 backs up the strands of the frayed end 32, adding momentum and preventing excessive squishing of the strands. While the washer 34 limits the radius of the cavity which the frayed end 32 can clean, the washer 34 also contributes to the scrubbing effect of the frayed end 32.

Figure 5:
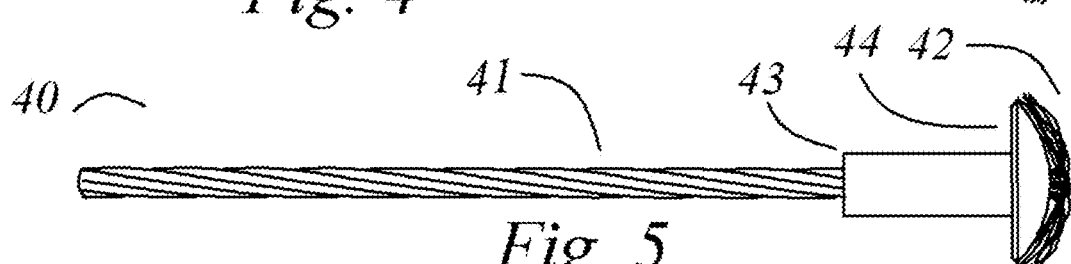

FIG. 5 shows a frayed cable scaling tool 40 having a cable 41. A frayed end 42 of the cable 41 is formed in an umbrella shape as is the frayed end 22 of FIG. 3. A means for preventing unraveling of the cable 41 comprises a collar 43. The collar 43 prevents the cable 41 from unraveling more than desired in use. The frayed end 42 is reinforced by a convex washer 44 that is shaped as a segment of a hollow sphere or a hollow truncated frustrum, the typical shape of a Belleview washer.

Figure 6:
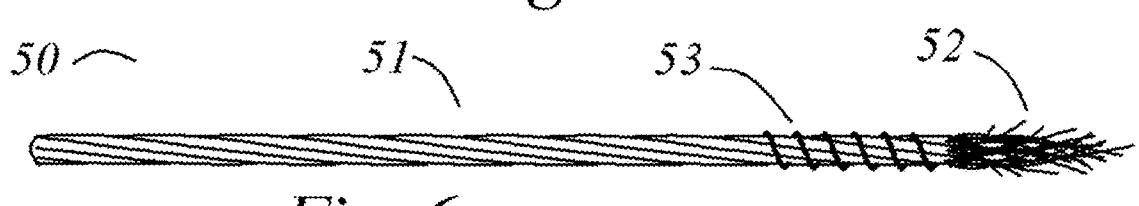

FIG. 6 shows a frayed cable scaling tool 50 having a cable 51. A frayed end 52 is shaped into a point by cutting the strands of the cable 51 into a point prior to or while fraying it. A means for preventing unraveling of the cable 51 comprising a collar comprising a spring 53 wrapped tightly around the cable 51 prevents the cable 51 from unraveling more than is desired in use. The pointed end of the frayed end 52 is useful for cleaning crevices and fine details in a surface that is to be scaled. The end of the cable 51 can be shaped like a pencil using a grinding wheel or other tool prior to fraying the end.

FIG. 7 shows a frayed cable scaling tool 60 having a cable 61. A frayed end 62 is unraveled to form a wire brush. A means for preventing unraveling of the cable 61 comprises a collar 63. The collar 63 prevents the cable 61 from unraveling more than intended in use. In FIG. 7, the collar 63 is shown in section to show more clearly that the cable 61 is continuous passing through the collar 63 as one piece. In the example of FIG. 7, the collar 63 is retained on the cable by one or more set screws 64.

FIG. 8 shows a frayed cable scaling tool 70 having a first 1 cable 71 and a second cable 73. A frayed end 72 is unraveled to form a wire brush. A means for preventing unraveling of the second cable 73 comprises a collar 74. The collar 74 keeps the second cable 73 from unraveling more than desired in use. The collar 74 is shown in section to show that the first cable 71 and the second cable 73 can be two pieces of cable, in which case the collar 74 serves as a splice to join the first 1 cable 71 to the second cable 73. In the example of FIG. 8, the collar 63 is preferably permanently attached to the first cable 71 as by crimping, brazing, bonding with epoxy, etc., as examples, not limitations. The second cable 73 is shown attached in the collar 74 using one or more set screws 75 so that the frayed end 72 can be replaced when worn out.

There are many choices when procuring cable for a frayed cable scaling tool, both the material of which the cable is made and the stranding. A cable designed for high strength and flexibility may have a large number of small diameter steel strands that, when frayed, will form a relatively softer brush with a large number of bristles. A stiffer cable may have fewer strands of thicker wire. When it is frayed, the resulting brush will be stiffer with fewer but coarser bristles. A cable made of polypropylene or other plastic will have very flexible strands and will form a very soft brush when frayed. The soft bristles from fraying a polypropylene cable may be the best for certain cleaning tasks, but the polypropylene cable would not have the stiffness to transmit well the reciprocating motion from a pneumatic reciprocating tool. Accordingly, this would be a good application for the frayed cable scaling tool 71 of FIG. 8. The first cable 71 could be a relatively stiff steel or aluminum cable, as an example, not a limitation, and the second cable 73 could be of a softer material such as the aforementioned polypropylene, or nylon, brass, bronze, copper, sisal, hemp, cotton, etc., as examples, not limitations.

FIG. 9 shows a frayed cable scaling tool 80 having a cable 81. A frayed end 82 is unraveled to form a wire brush. FIG. 9 shows that the means for preventing unraveling of the cable comprising collars 4, 13, 23, 33, 43, 53, 63 and 74 of FIGS. 1 through 8 are not the only way to keep the cable 81 from unraveling. In FIG. 9, the cable 81 has a means for preventing unraveling of the cable 81 comprising having the cable 81 impregnated with a bonding agent 83. An impregnated bonding agent may not be visible above the surface of the cable 81, but the means for preventing unraveling of the cable 81, an area of impregnation with the bonding agent 83, is shown in FIG. 9 by cross hatching. On the other end of the cable 81, opposite the frayed end 82, there is a second unraveling prevention means 84 also comprising having the cable 81 impregnated with a bonding agent. The bonding agent penetrates the cable 81 comprising the strands thereof and binds the strands together as a solid that cannot be unraveled easily. The preferred bonding agent is brass, applied with flux and heat as is usual for brazing. Alternative bonding agents may be a polymer resin that can be cured once it has impregnated the cable 81 or a thermosetting resin that can be melted for impregnation then solidified by cooling, as examples, not limitations. It is desirable that the penetrating bonding agent penetrate to the center of the cable 81, but that is not essential. A thin penetration that bonds the peripheral strands of the cable 81 would be sufficient in many cases.

FIG. 10 shows a frayed cable scaling tool 90 comprising a cable 91 and a frayed end 92. In this example, a means for preventing unraveling of the cable 91 comprises an area 93 of the cable 91 which has been spot-welded. This compresses the cable 91 and makes a flat spot 93 where the strands of the cable 91 are compressed and welded together by the passage of a high electrical current.

FIG. 11 shows a frayed cable scaling tool 100 comprising a cable 101 and a frayed end 102. In this example, a first means for preventing unraveling of the cable 101 comprises a first collar comprising a thin metal sleeve 103 that is crimped around the cable 101. A second means for preventing unraveling of the cable 101 also comprises a second collar comprising a thin metal sleeve 104 that is crimped around the cable 101 and prevents unraveling of the end of the cable 101 opposite the frayed end 102.

FIG. 12 shows a frayed cable scaling tool comprising a cable 111 and a frayed end 112. A means for preventing unraveling of the cable 111 comprises collar comprising a ferrule 113. The ferrule 113 is compressed around the cable 111 and prevents the cable from unraveling more than is desired. The ferrule 113 is similar to a ferrule used in a compression fitting in plumbing and it may be compressed around the cable 111 with a tool that simulates the operation of a compression fitting when it is tightened. Compression fitting are familiar to one skilled in the art of plumbing.

Figure 13:
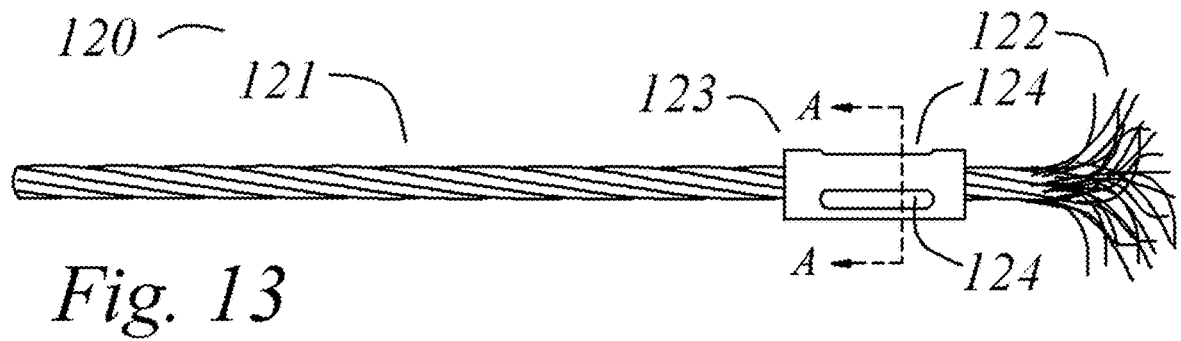
Figure 14:
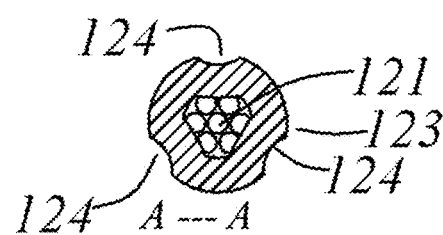

FIGS. 13 and 14 show, respectively, a side view and a section of a frayed cable scaling tool 120 comprising a cable 121 and a frayed end 122. A means for preventing unraveling of the cable 121 comprises a collar 123. The collar 123 prevents the cable 121 from unraveling more than is desired. The preferred method of attaching the collar 123 to the cable 121 is by crimping it with a symmetrical crimping tool. FIGS. 13 and 14 show three symmetrical dimples 124-124 evenly spaced around the collar 123, as an example, not a limitation.

Figure 15:
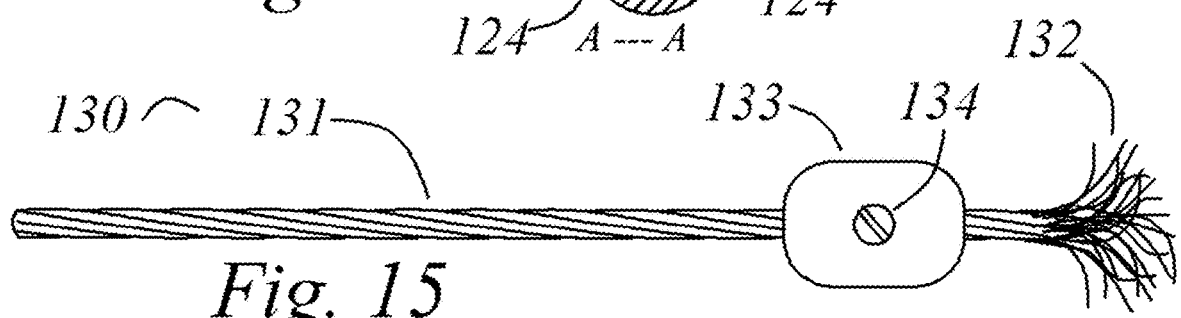

FIG. 15 shows a frayed cable scaling tool 130 comprising a cable 131 and a frayed end 132. A means for preventing unraveling of the cable 131 comprises a collar 133. The collar 133 prevents the cable 131 from unraveling more than is desired. In the example of FIG. 15, the collar 133 is bulkier than in other examples, which may provide added momentum to the cable 131 near the frayed end 132. The collar 133 has rounded corners, which may prevent or reduce damage to the item being scaled. Also, the collar 133 is shown retained by set screws 134, one of which is visible. Preferably there are multiple set screws 134 so that the clamping of the set screws 134 is symmetrical around the cable 131 and it is more secure, though a single set screw 134 is an option. While a set screw 134 or multiple set screws 134 are a convenient way to attach the collar 133 to the cable 131, the vibration is extreme when the frayed cable scaling tool is in use, so it is preferred to use a thread locking compound on the threads of the set screw(s) 134.

Figure 16:
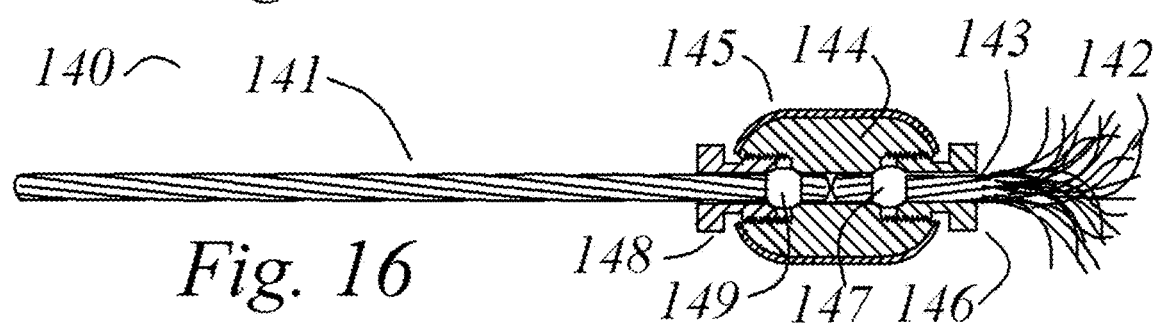

FIG. 16 shows a frayed cable scaling tool 140 comprising a first cable 141, a second cable 143, and a frayed end 142. A means for preventing unraveling of the second cable 143 comprises a collar 144. The collar 144, shown in section, prevents the cable 143 from unraveling more than is desired as well as acting as a splice connecting the first cable 141 to the second cable 143. In the example of FIG. 16, the collar 143 is retained by a first ferrule 147, a second ferrule 149, a first reverse compression nut 146 and a second reverse compression nut 148 that are threaded into the collar 144. When the first reverse compression nut 146 is tightened, the first ferrule [147 is compressed around the second cable 143 just as in a compression fitting used in plumbing. Similarly, when the second reverse compression nut 148 is tightened, the second ferrule 149 is compressed around the first cable 141. The section of the collar 144 also shows that it may be coated with a rubbery coating 145. The rubbery coating 145 and the rounded edges of the collar 144 cooperate to reduce damage to the item being scaled that might be caused by impact of the collar 144.

Figure 17:
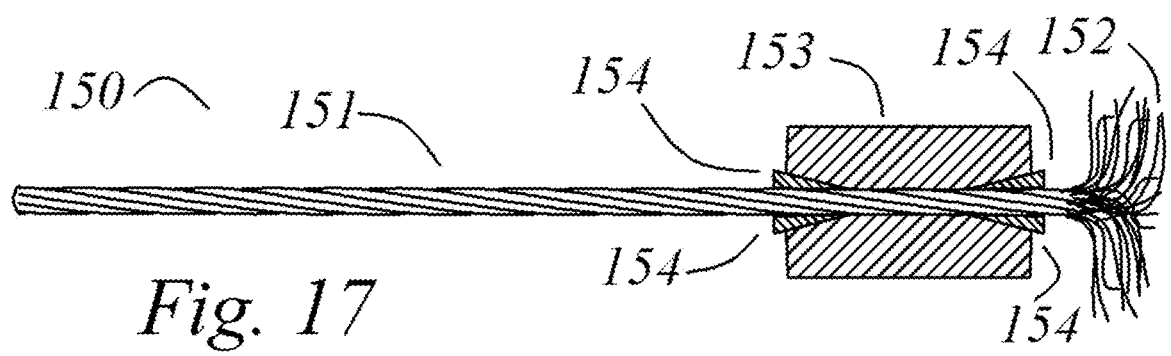

FIG. 17 shows a frayed cable scaling tool 150 comprising a cable 151 and a frayed end 152. A means for preventing unraveling of the cable 151 comprises a collar 153. The collar 153, shown in section, prevents the cable 151 from unraveling more than desired. In this example, the collar 153 is retained to the cable 151 by a plurality of wedges 154-154 driven into complementary receptacles in the collar 153. Preferably, the wedges 154-154 are curved to conform to the cable 151 on the inside. The wedges 154-154 are pressed or driven in with high force, but because the vibration level is high when the frayed cable scaling tool us in use, it is preferred also to use a bonding agent such as epoxy, as an example, not a limitation, to retain the wedges 154-154 in the collar 153.

Figure 18:
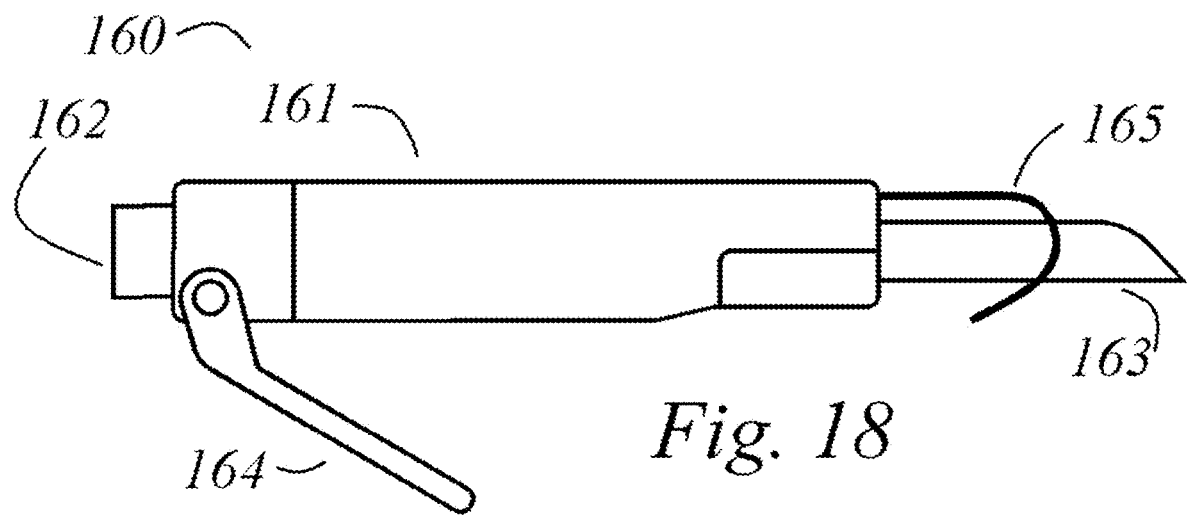
FIGS. 18 through 22 show a representative pneumatic reciprocating power tool and parts thereof.

FIG. 18 shows a generic pneumatic reciprocating power tool 160 comprising a body 161, and air inlet 162, a saw blade 163, a throttling valve 164 and a guard 165. The pneumatic reciprocating power tool 160 is the preferred power source for the frayed cable scaling tool when it is used and no novelty is claimed for the pneumatic reciprocating power tool 160. When the pneumatic reciprocating power tool 160 is used as a power source for the frayed cable scaling tool, the saw blade 163 is removed.

Figure 19:
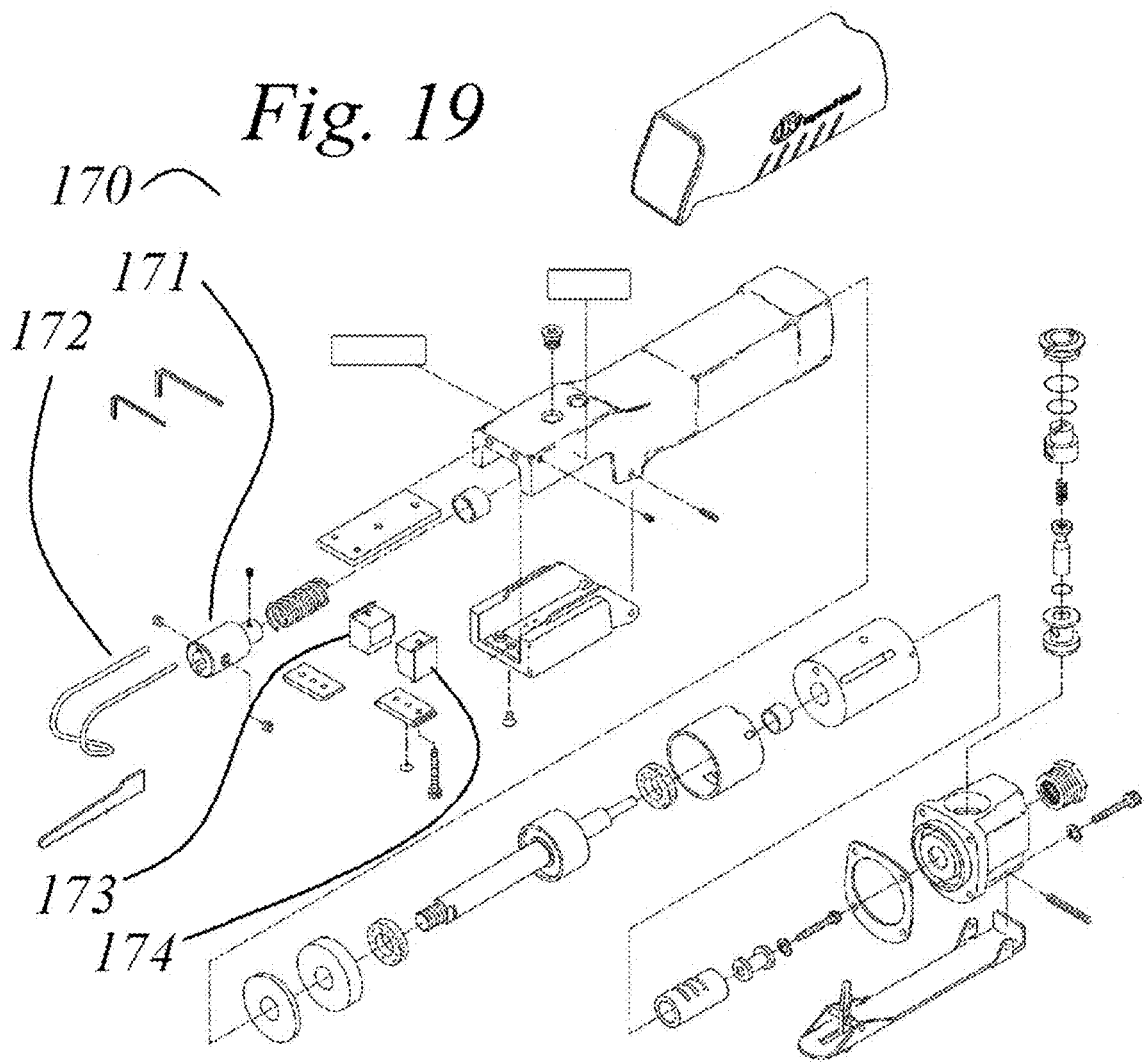

FIG. 19 shows an exploded parts diagram 170 of a representative generic pneumatic reciprocating power tool copied and pasted into FIG. 19. None of the parts therein are part of this invention and most have no relevance to this discussion, thus are not identified by reference designators and are not discussed. A few parts are identified because they may need to be modified to use the pneumatic reciprocating power tool to power a frayed cable scaling tool. In particular, the chuck 171 may need to be modified to accept the end of a round cable. It may need to be drilled out so that it can accept a round cable. The guard 172 may be removed or modified as described in the following. The guide blocks 173 and 174 collectively define a slit which guides a saw blade such as the saw blade 163 of FIG. 18. They may need to be removed r or modified by machining to permit a round cable to pass between them unimpeded. For most generic pneumatic reciprocating power tools, no other parts need to be modified.

Figure 20:
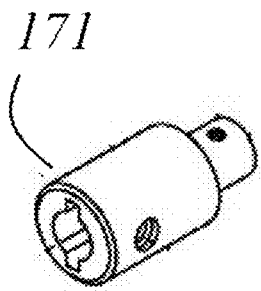

FIG. 20 shows the chuck 171 of FIG. 19. This particular chuck 171 has a round hole, so it can receive a cable without modification, unless possibly the hole needs to be enlarged to receive a larger cable.

Figure 21:
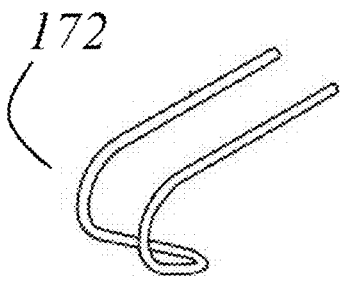

FIG. 21 shows the guard 172 of FIG. 19. The guard 172 may or may not be left in place when the generic pneumatic reciprocating power tool is used to drive a frayed cable scaling tool. For some embodiments of the frayed cable scaling tool, the guard 172 may be modified or replaced by an adapter as described in the following.

Figure 22:
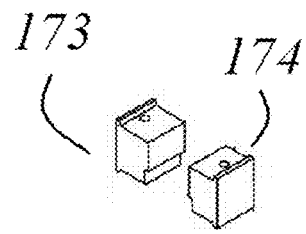

FIG. 22 shows the guide blocks 173 and 174 of FIG. 19. Together, the guide blocks 173 and 174 define a slit that guides a saw blade such as the saw blade 163 of FIG. 18. It may be possible to remove the guide blocks 173 and 174 and just not use them. Otherwise, they can be machined by notching each with complementary notches so that together they define a round opening through which a cable can pass. With care, the guide block 173 and 174 can be notched in the middle while retaining the slit above and below the round opening so that they can still be used to guide a saw blade.

Figure 23:
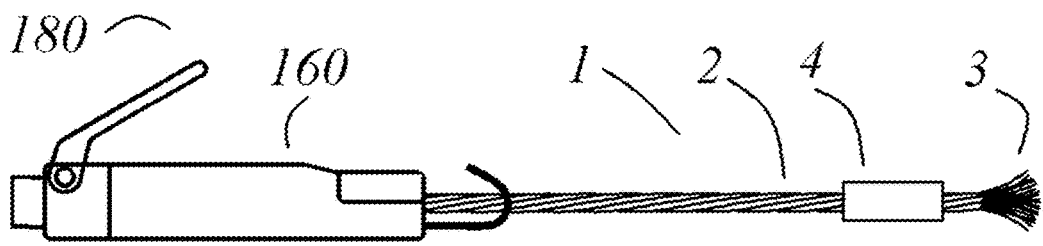
FIG. 23 shows a frayed cable scaling tool installed in a representative pneumatic reciprocating power tool.

FIG. 23 shows a frayed cable scaling tool 180 comprising the pneumatic reciprocating power tool 160 of FIG. 18 driving the frayed cable scaling tool 1 of FIG. 1. The frayed cable scaling tool 1 comprises a cable 2, a frayed end 3 and a means for preventing unraveling of the cable 2 comprises a collar 4. The collar 4 to prevent the cable from unraveling more than is desired. The pneumatic reciprocating power tool 160 requires a source of air, but that is not part of this invention and is not shown.

The pneumatic reciprocating power tool is the preferred power source for the frayed cable scaling tool but optionally any tool that provides reciprocating motion can be used. A desirable characteristic of the pneumatic reciprocating power tool is that an air cylinder powers the power stroke, and a spring provides the return force. Both are elastic, so if the frayed cable scaling tool encounters an irresistible object, the force exerted is limited. A number of reciprocating power tool such as most electric reciprocating saws are cam driven and are unyielding. If a frayed cable scaling tool powered by an electric reciprocating saw of usual construction encounters an irresistible object, then the cable buckles and/or the reciprocating power tool kicks back as a reaction. Often, this would not be of much consequence, but it is a reason to prefer the pneumatic reciprocating power tool to power the frayed cable scaling tool.

Another example of a reciprocating power tool would be a simple handle such as might be on a file and the reciprocating motion may be provided manually by human power. This will not provide the forceful scaling of a frayed cable scaling tool powered by a pneumatic reciprocating power tool, but it may be useful for light cleaning jobs or touch up.

Figure 24:
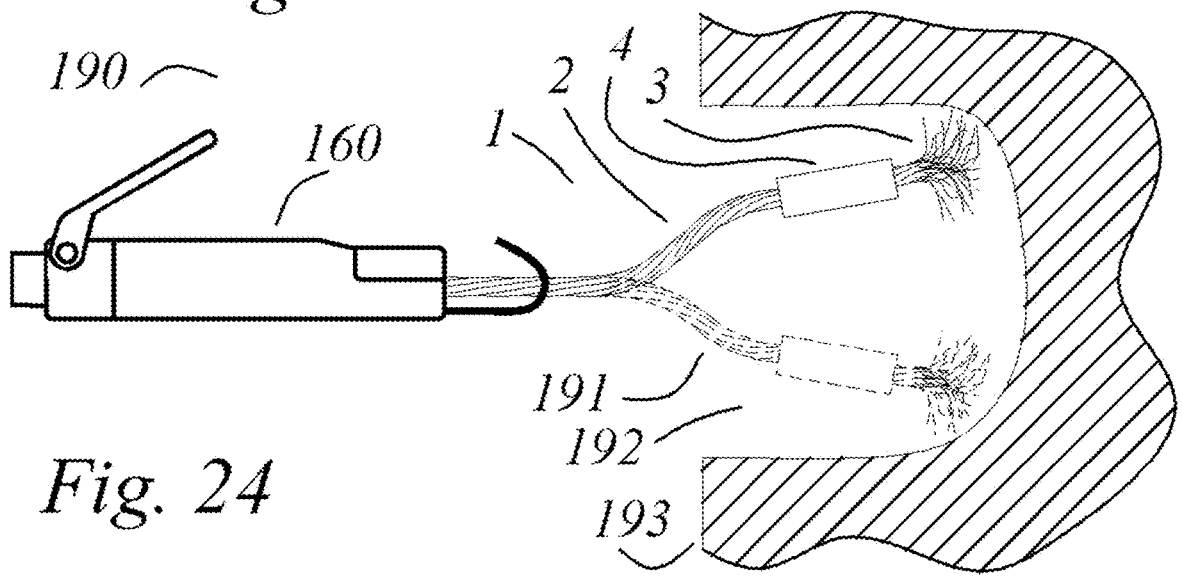
FIG. 24 shows a frayed cable scaling tool being used to clean a cavity in a casting. The frayed cable is shown in alternative positions as it is reciprocated.

FIG. 24 shows a frayed cable scaling tool 190 being used to scale a cavity 192 in a casting 193. A pneumatic reciprocating power tool 160 drives the frayed cable scaling tool 1 of FIG. 1 comprising a cable 2, a frayed end 3 and a means for preventing unraveling of the cable 2 comprising a collar 4, The collar 4 prevents the cable 2 from unraveling more than is desired. The frayed cable scaling tool is also shown in phantom as 191 to illustrate that when in operation, the frayed cable scaling tool 1 oscillates vigorously and randomly within the cavity 192. A generic pneumatic reciprocating power tool typically is rated for 10,000 strokes per minute though the added inertial of a frayed cable scaling tool almost certainly reduces that rate. Nonetheless, the motion is vigorous, the cable 2 flexes and the frayed cable scaling tool 1 bounces around vigorously and randomly so that the frayed end 3 scours the inside surface of the cavity 192. The operator of the frayed cable scaling tool 190 has some control of the depth of the scaling tool into the cavity but there is very little control of the sideways motion.

FIG. 25 shows a frayed cable scaling tool 200 being used to clean a tube 204. The frayed cable scaling tool 200 comprises the pneumatic reciprocating power tool 160 of FIG. 18, a cable 201, a frayed end 202 and a means for preventing unraveling of the cable 201 comprising a collar 203. The collar 203 prevents the cable 201 from unraveling more than is desired. In the tube 204, the lateral motion of the frayed end 202 and the collar 203 is constrained by the wall of the tube 204. However, the cable 201 is unconstrained or poorly constrained and will tend to whip around within the tube. The cable 201 may also buckle some, reducing the stroke and power delivered to the frayed end 202.

FIG. 26 shows a frayed cable scaling tool 210 comprising a cable 211, a frayed end 212 and a means for preventing unraveling of the cable 211 comprising a collar 213. The collar 213 prevents the cable 211 from unraveling more than is desired. The frayed cable scaling tool 210 further comprises a guide tube 214. The guide tube 214, shown in section, can be used to keep the cable 211 aligned and prevent it from whipping around and buckling. Preferably, the tube 214 fits snuggly to the cable 211 but it is not so tight so that the cable 211 cannot move back and forth easily in a reciprocating motion but is restrained from lateral motion or whipping around. In many uses of a frayed cable scaling tool, it may be useful or necessary to guide the cable, but it would be very ill advised to try to do so with bare hands or even with gloved hands. While cables usually are smooth, often there are protruding broken wire strands that can cause severe injury to a bare hand or even a gloved hand. The simple tube 214 can be held in a hand to guide the cable 211.

FIG. 27 shows a frayed cable scaling tool 220 comprising a cable 221, a frayed end 222 and a means for preventing unraveling of the cable 2 comprising a collar 223. The collar 223 prevents the cable 221 from unraveling more than is wanted. The frayed cable scaling tool 220 further comprises a guide tube 224. The guide tube 224 fits snuggly around the collar 223 and constrains the motion of the collar 223 and thus the motion of the frayed end 222. The guide tube 224 can be held in a hand and can direct the scrubbing action of the frayed end 222 as desired. However, most of the length of the cable 221 is unconstrained.

FIGS. 28 and 29 show a frayed cable scaling tool 230. FIG. 28 shows a partial section view and FIG. 29 shows a plan view. The frayed cable scaling tool 230 comprises a cable 231, a frayed end 232 and a means for preventing unraveling of the cable 231 comprising a collar 233. The collar 233 prevents the cable 231 from unraveling more than is desired. The frayed cable scaling tool 230 further comprises a guide tube 234. The guide tube 234 surrounds the center portion of the frayed cable scaling tool and has a small diameter for most of its length that conforms snuggly to the cable 231 but is enlarged at one end to conform snuggly to the collar 233. The enlarged portion of the guide tube 234 must be longer than the collar 233 to accommodate its reciprocating travel. There will be some trapped air within the guide tube 234 that will compress and expand somewhat as the collar 233 moves within the guide tube 234. This does not seem to be of any consequence, but it can be reduced or eliminated by providing a bleed hole (not shown), by having the expanded portion of the guide tube 234 fit more loosely around the collar 233 or by providing vent channels (not shown) in the periphery of the guide tube 234, as examples, not limitations.

Figure 30:
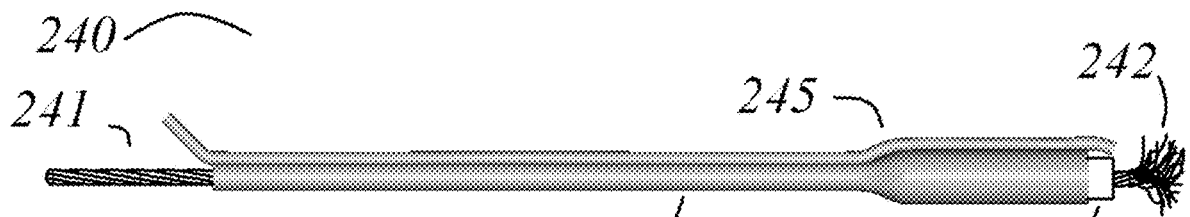

FIG. 30 shows a frayed cable scaling tool 240 comprising a cable 241, a frayed end 242 and a means for preventing unraveling of the cable 241 comprising a collar 243. The collar 243 prevents the cable 241 from unraveling more than desired. A guide tube 244 surrounds the center portion of the frayed cable scaling tool and has a small diameter for most of its length that conforms snuggly to the cable 241 but is enlarged at its end to conform snuggly to the collar 243. An auxiliary tube 245 is attached to the guide tube 244 for its entire length and extends a little more on both ends. The auxiliary tube 245 may be used to introduce cleaning fluid to the work area of the frayed end 242 or it may be used to introduce compressed air to blow out debris, as examples, not limitations.

Figure 31:
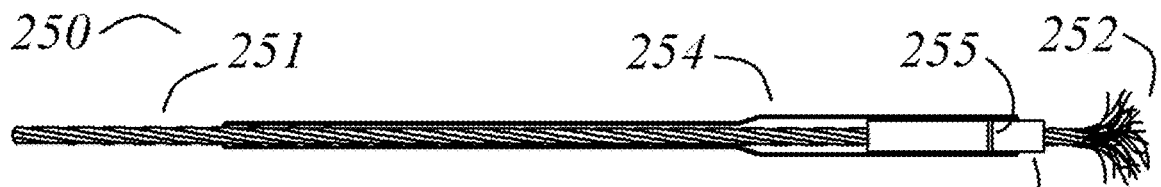

FIG. 31 shows a frayed cable scaling tool 250 comprising a cable 251, a frayed end 252 and a means for preventing unraveling of the cable 251 comprising a collar 253. A guide tube 254 surrounds the center portion of the frayed cable scaling tool and has a small diameter for most of its length that conforms snuggly to the cable 251 but is enlarged at its end to conform snuggly to the collar 253. The cable 251, the collar 253 and the inside of the guide tube 254 may be lubricated with oil or grease, but it may be undesirable for the oil or grease to leak into the work area of the frayed end 252. Accordingly, the collar 253 has a circumferential groove therein for an O-ring 255.

Figure 32:
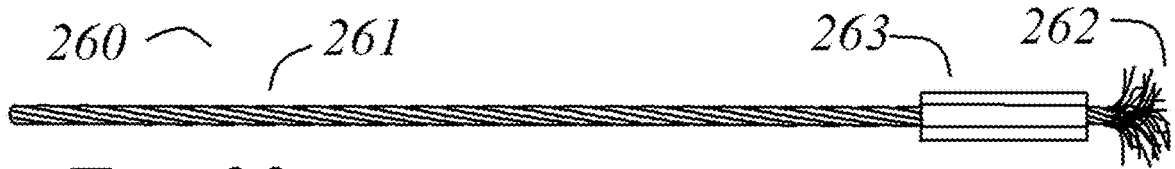

FIG. 32 shows a frayed cable scaling tool 260 comprising a cable 261, a frayed end 262 and a means for preventing unraveling of the cable 261 comprising a collar 263. The collar 263 prevents the cable 261 from unraveling more than is desired. The collar 263 is attached to the cable 261 as by crimping, as an example, not a limitation. The collar 264 is made using hex stock or is formed to have a hexagonal section. This can be used to prevent rotation. The hexagonal section is shown as an example, not a limitation. Many profiles would prevent rotation, and many of them would be suitable for this purpose.

Figure 33:
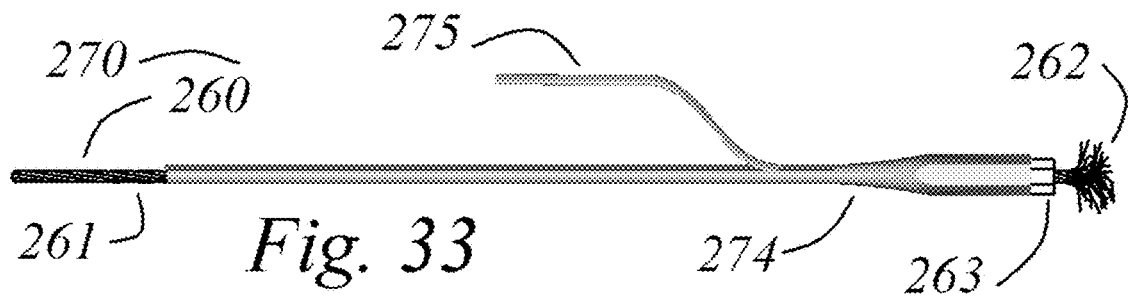

FIG. 33 shows a frayed cable scaling tool 270 comprising the frayed cable scaling tool 260 of FIG. 32 further comprising a guide tube 274. The guide tube 274 surrounds the center portion of the frayed cable scaling tool and has a small diameter for most of its length that conforms snuggly to the cable 261 but is enlarged at its end to conform snuggly to the collar 263. The enlarged portion of the guide tube 234 has a hexagonal section to conform to the hexagonal section of the collar 263. This prevents rotation of the collar 263 relative to the guide tube 274, which also prevents rotation of the frayed end 262 relative to the guide tube 274. The guide tube 274 further comprises a handle 275 to facilitate controlling the angle of rotation of the guide tube 274. In use, the frayed end 262 may wear unevenly or may be pounded into an asymmetrical shape. In particular, if it is used on a flat surface, the frayed end 262 will tend to flatten on one side creating a stable position that will persist. The hexagonal collar 273 moving within the hexagonal portion of the guide tube 274 permits rotating the frayed end 262 to a new orientation by turning the guide tube 274.

Figure 34:
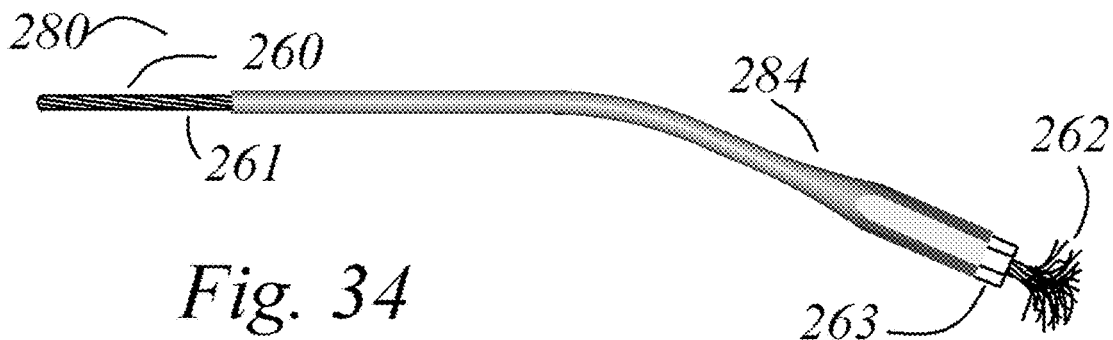

FIG. 34 shows a frayed cable scaling tool 280 comprising the frayed cable scaling tool 260 of FIG. 32 further comprising a guide tube 284. FIG. 34 shows that the guide tube 284 can be bent at an angle, being careful not to kink the guide tube 284 nor to form a bend that has too small a radius for the flexibility of the cable 261.

Figure 35:
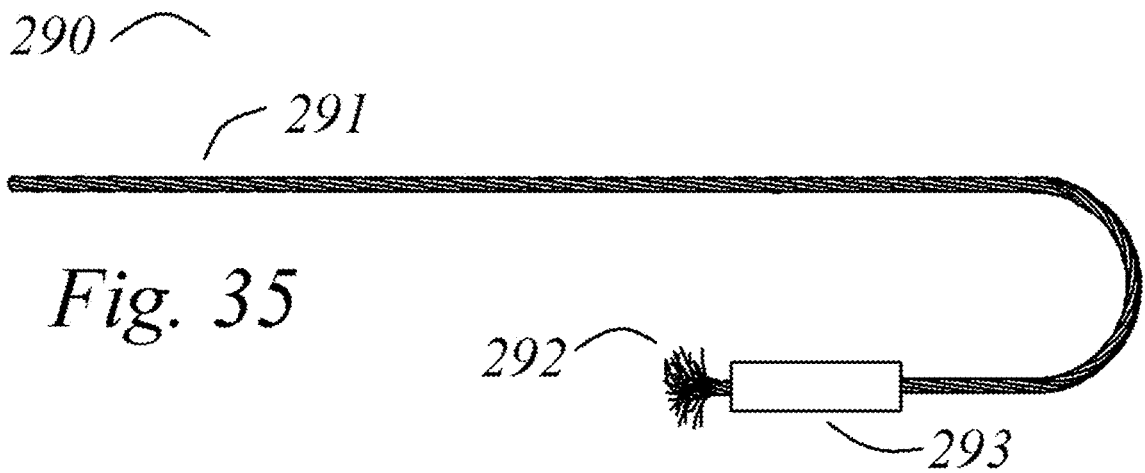

FIG. 35 shows a frayed cable scaling tool 290 comprising a cable 291, a frayed end 292 and a means for preventing unraveling of the cable 2 comprising a collar 293. The collar 293 prevents the cable 291 from unraveling more than is desired. FIG. 35 shows that the cable 291 is flexible and that it can be bent around a corner, a 180° bend being shown as an example, not a limitation. However, the frayed cable scaling tool 290 as shown is not operational. If the cable 291 is placed in a reciprocating power tool and reciprocated, it will just flex the cable 291 at the bend and the frayed end 292 will not move.

Figure 36:
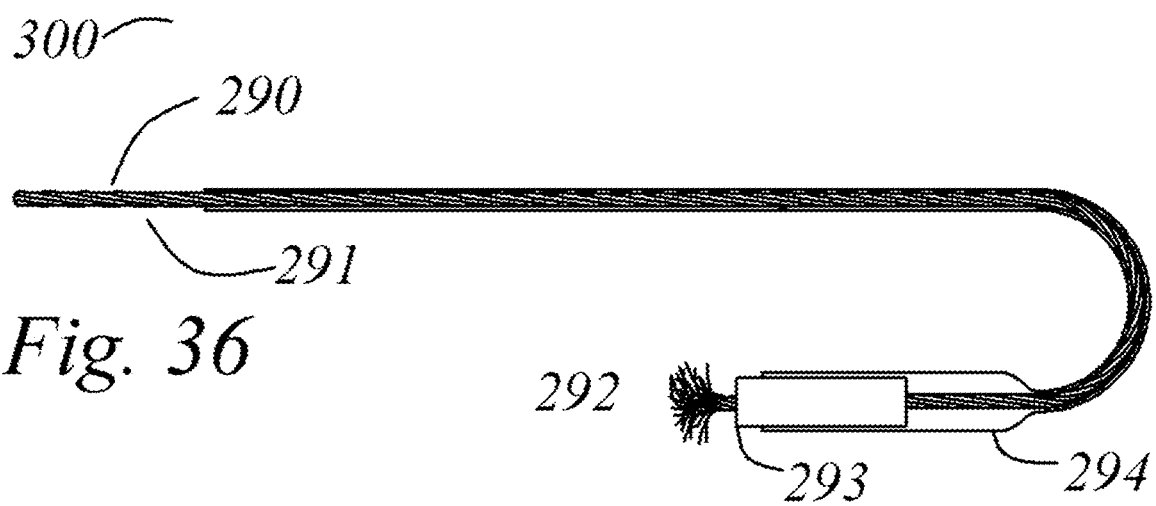
Figure 37:
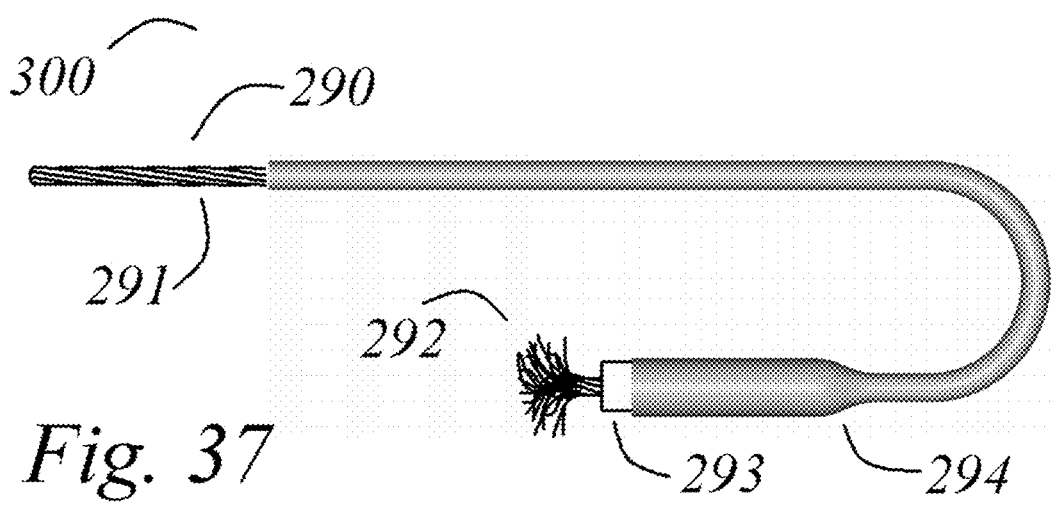

FIGS. 36 and 37 show a frayed cable scaling tool 300 that is the frayed cable scaling tool 290 of FIG. 35 further comprising a guide tube 294. FIG. 36 is a partial section view and FIG. 37 is a plan view. Once the frayed cable scaling tool 290 is constrained by the guide tube 294, the cable 291 can no longer flex at the bend and reciprocating motion will be transferred around the bend so that the frayed end 292 also reciprocates. This arrangement is useful for removing debris from blind spots.

Figure 38:
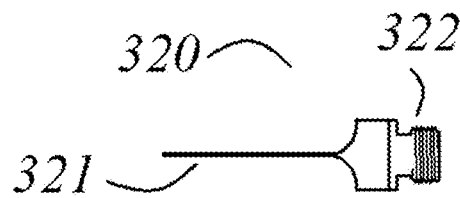
FIGS. 38 and 39 show an adapter to use a frayed cable scaling tool in any reciprocating power tool that will accept a saw blade.
Figure 39:
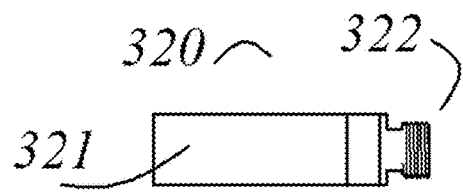

FIGS. 38 and 39 show a top view and a side view respectively of an adapter 320 comprising a flat portion 321 that is shaped like the tang of a saw blade so that it can be inserted into a pneumatic reciprocating power tool or an electric reciprocating saw tool, as examples, not limitations. The adapter 320 further comprises a receptacle 322 for receiving and retaining a cable of a frayed cable scaling tool. In the drawings, the receptacle 322 is shown as a male compression tube fitting such as is commonly used in plumbing, as an example, not a limitation. There are many ways to receive and retain a cable, and many of them may be adapted for use in the adaptor 320.

Figure 40:
FIG. 40 shows the adapter installed in a representative pneumatic reciprocating power tool.

FIG. 40 shows a pneumatic reciprocating power tool 330, which is the pneumatic reciprocating power tool 160 of FIG. 18 with the saw blade 163 replaced with the adapter 320 of FIGS. 38 and 39.

Figure 41:
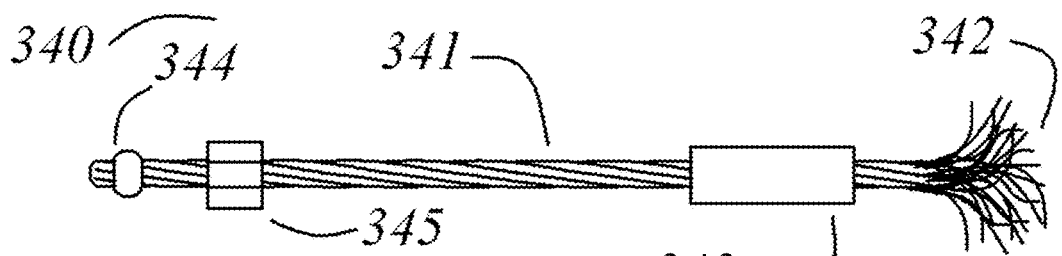
FIG. 41 shows a frayed cable scaling tool with a ferrule and nut.

FIG. 41 shows a frayed cable scaling tool 340 comprising a cable 341, a frayed end 342 and a means for preventing unraveling of the cable 2 comprising a collar 343. The collar 343 is used to prevent the cable 341 from unraveling more than is desired. The frayed cable scaling tool 340 further comprises a ferrule 344 and a compression nut 345 that are similar, respectively, to a ferrule and a compression nut used in plumbing. The cable 341, the ferrule 344 and the compression nut 345 are intended to be used with the adapter 320 of FIGS. 38 and 39. Initially, the ferrule 344 fits loosely on the cable 341, but after it is tightened in the adapter 320, the ferrule 344 is compressed around the cable 341 so that it fits very tightly and can retain the cable 341 in the adapter 320.

Figure 42:
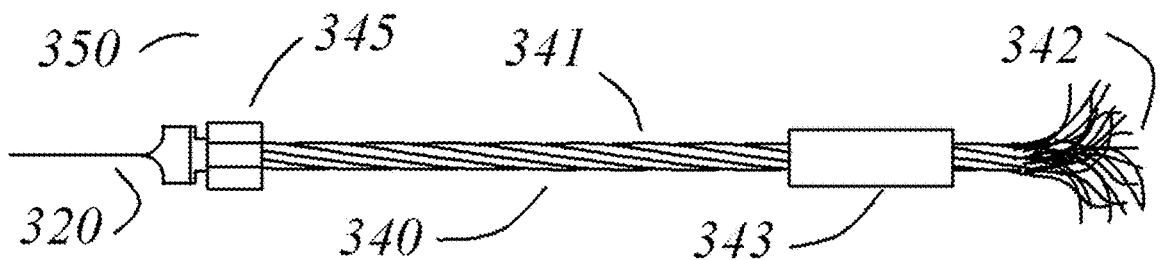

FIG. 42 shows a frayed cable scaling tool 350 which is the frayed cable scaling tool 340 of FIG. 41 installed in the adapter 320 of FIGS. 38 and 39. The frayed cable scaling tool 350 can be used in any reciprocating power tool that will accept a compatible saw blade.

FIG. 43 shows a frayed cable scaling tool 360 which is the frayed cable scaling tool 340 of FIG. 41 installed in the pneumatic reciprocating power tool 0.330 of FIG. 40.

FIGS. 44 and 45 show a guide tube adapter 370. FIG. 44 is a side view and FIG. 45 is a top view. The guide tube adapter 370 is intended to replace the guard 165 of FIG. 18 or the guard 172 of FIGS. 19 and 21. The guide tube adapter 370 comprises a disc 372, as an example, not a limitation, two retaining pins 371-371 and a guide tube receptacle 373, shown, as an example, not a limitation, as a female part of a compression fitting as is used in plumbing. The two retaining pins 371-371 are of the same diameter and of the same spacing as the prongs of the guide 165 of FIG. 18 so that the guide tube adapter 370 can be installed in the pneumatic reciprocating power tool 160 of FIG. 18 in the place of the guard 165. The guide tube receptacle 373 is aligned with the chuck (not shown) of the pneumatic reciprocating power tool 160. FIGS. 19 and 20 show another chuck 171, which is representative.

FIG. 46 shows a frayed cable scaling tool 380 comprising a pneumatic reciprocating power tool 160, a cable 381, a frayed end 382 and a means for preventing unraveling of the cable 381 comprising a collar 383. The collar 383 prevents the cable 381 from unraveling more than is desired. The frayed cable scaling tool 380 further comprises a guide tube 384 that is attached to the pneumatic reciprocating power tool 160 using the guide tube adapter 370 of FIGS. 44 and

45. A compression nut 385 retains the guide tube 384 to the guide tube adapter 370. A ferrule (hidden) on the guide tube 384 within the compression nut 385 fits tightly onto the guide tube 384 after the first time that the guide tube 384 is installed into the guide tube adapter 370 and the compression nut 385 is tightened, as is well known to one skilled in the art of plumbing and compression fittings.

FIGS. 1 through 8 and 11 through 17 show many variations of the means for preventing unraveling of a cable comprising a collar, as examples, not limitations. Many collars are shown attached to the cable and they have a variety of weights, shapes, material, coatings, and methods of attachment, as examples of collars, not limitations. For some applications, it may be desired to minimize the weight of the collar to minimize the added inertia that it causes. This suggests a collar of light weight material such as aluminum or plastic, as examples not limitations, or a means for preventing unraveling that has low weight such as a spring wound around the cable or a thin sleeve crimped to the cable, as examples, not limitations. FIG. 9 shows a means for preventing unraveling comprising an impregnant that adds very little weight or no weight such as by impregnating the cable with braze or a polymer. FIG. 10 shows fusing the cable by spot welding it, as an example, not a limitation.

A large inertia in the collar tends to resist the reciprocating motion of a reciprocating power tool, which can make the cable and frayed end move less and the reaction forces can make the reciprocating power tool move more, to the point where it could be difficult to handle. That may define one upper limit for the weight of a collar. In operation, the cable of the frayed cable scaling tool can flex, side to side, and it does so, oscillating vigorously and randomly in all directions, ricocheting off the sides of a cavity being scaled. Control of the depth of engagement of the frayed cable scaling tool is good if it is short, but there is essentially no control of the lateral motion of the frayed end as it whips around. This makes it excellent for cleaning out a short cavity in a casting, such as an intake port in the head of an internal combustion engine, as an example, not a limitation.

A heavier collar adds to the momentum of the frayed cable scaling tool and the scrubbing action of the frayed end of the cable will be more forceful as it moves laterally, which is beneficial. However, a heavier collar itself will bang into the sides of the cavity and may cause damage if it is excessively heavy or has sharp edges. Rounded corners and a rubber coating may help prevent damage.

A frayed cable scaling tool may be used to clean the inside of a tube, and the frayed end of the frayed cable scaling tool may fit in the tube with little or no side clearance. In this case, the random lateral motion of the wire end will be constrained, and little would be gained by using a heavy collar. To the contrary, more inertia may be detrimental. To clean a longer tube, a frayed cable scaling tool with a longer cable may be needed. The longer cable will have more inertia, and the collective inertia of the frayed cable scaling tool will resist the reciprocating motion of the reciprocating power tool that is driving the frayed cable scaling tool. In the limit, the frayed cable scaling tool may move very little, and the reaction of the inertia may reflect to the reciprocating power tool causing it to move instead of the frayed end of the frayed cable scaling tool. If this happens, a heavier, more powerful reciprocating power tool, preferably operating at a slower stroke rate, would be effective at extending the length of the cable that could be used, but eventually the collective inertia would limit the length of cable that could be used.

A lighter weight cable, such as aluminum, as an example, not a limitation, would have lower inertia and a longer length could be used. However, most alloys of aluminum are much softer than the steel wire used in steel cable, so it may not be an appropriate material for a frayed end. Thus, the use of a collar that is also a splice so that cables of different material can be used.

The frayed cable scaling tool can alternatively be driven by a rotating power source such as a drill or a power source that both reciprocates and rotates such as a hammer drill, as an example, not limitations. This is not preferred because of safety. The reciprocating frayed cable scaling tool whips around with little control, but the force is limited, and the travel also is limited. The same tool in a rapidly rotating drill would have a large centrifugal force and it could do a lot of damage. If a rotating power source is used, it would be highly recommended to use it with a guide tube.

The invention claimed is:

1. A frayed cable scaling tool comprising:
A wire cable having a first end and a second end,
the first end of the wire cable is configured to be received and retained by a chuck of a reciprocating power tool,
the second end of the wire cable is frayed to form a brush,
the wire cable further is bound adjacent to the brush to prevent the wire cable from unraveling beyond the brush, and
the reciprocating power tool,
the reciprocating power tool having the chuck that is configured to receive and retain the first end of the wire cable,
whereby the wire cable and the brush are reciprocated when the reciprocating power tool is operated.

2. The frayed cable scaling tool of claim 1 in which the wire cable is bound adjacent to the brush by a collar to prevent the wire cable from unraveling beyond the brush.

3. The frayed cable scaling tool of claim 1 in which the wire cable is bound adjacent to the brush by an impregnant that binds at least the peripheral strands of the wire cable to prevent the wire cable from unraveling beyond the brush.

4. The frayed cable scaling tool of claim 1 in which the wire cable is bound adjacent to the brush by welding the strands of the wire cable together adjacent to the brush to prevent the wire cable from unraveling beyond the brush.

5. The frayed cable scaling tool of claim 2 in which the collar is a spring that is wrapped tightly around the wire cable adjacent to the brush to prevent the wire cable from unraveling beyond the brush.

6. The frayed cable scaling tool of claim 1 further comprising a guide tube fitting around at least a portion of the frayed cable scaling tool to facilitate the axial reciprocal motion of the frayed cable scaling tool while limiting the lateral motion of the frayed cable scaling tool.

7. The frayed cable scaling tool of claim 1 further comprising a guide tube fitting around at least a portion of the wire cable of the frayed cable scaling tool to facilitate the axial reciprocal motion of the wire cable of the frayed cable scaling tool while limiting the lateral motion of the wire cable of the frayed cable scaling tool.

8. The frayed cable scaling tool of claim 2 further comprising a guide tube fitting around the collar of the frayed cable scaling tool to facilitate the axial reciprocal motion of the collar of the frayed cable scaling tool while limiting the lateral motion of the collar of the frayed cable scaling tool.

9. The frayed cable scaling tool of claim 2 further comprising a guide tube to facilitate the axial reciprocal motion of the frayed cable scaling tool while limiting the lateral motion of the frayed cable scaling tool the guide tube having a first section of the guide tube that fits around at least a portion of the wire cable of the frayed cable scaling tool, and the guide tube having a second section of the guide tube that fits around the collar.

10. The frayed cable scaling tool of claim 8 in which
the collar incorporates first anti-rotation features, and
the guide tube incorporates second anti-rotation features that are complementary to the first anti-rotation features of the collar, so that
the collar and the brush cannot rotate with respect to the guide tube.

11. A frayed cable scaling tool comprising: a wire cable having a first end and a second end, the first end of the wire cable configured to be accepted and retained by a second end of an adaptor, the second end of the wire cable is frayed to form a brush, the wire cable further is bound adjacent to the brush to prevent the wire cable from unraveling beyond the brush, and the adaptor, the adaptor having a first end and the second end, the first end of the adaptor is configured so that the adaptor can be inserted into a chuck of a reciprocating power tool and retained therein, the second end of the adaptor is configured so that the first end of the wire cable can be secured to the second end of the adaptor and retained.

12. The frayed cable scaling tool of claim 11 in which the first end of the adaptor has the shape of a tang to of a reciprocating saw blade.

13. The frayed cable scaling tool of claim 11
in which the wire cable is bound adjacent to the brush by a collar to prevent the wire cable from unraveling beyond the brush.

14. The frayed cable scaling tool of claim 11
in which the wire cable is bound adjacent to the brush by an impregnant that binds at least the peripheral strands of the wire cable to prevent the wire cable from unraveling beyond the brush.

15. The frayed cable scaling tool of claim 11
in which the wire cable is bound adjacent to the brush by welding the strands of the wire cable together adjacent to the brush to prevent the wire cable from unraveling beyond the brush.

16. The frayed cable scaling tool of claim 11 further comprising a guide tube fitting around at least a portion of the frayed cable scaling tool to facilitate the axial reciprocal motion of the frayed cable scaling tool while limiting the lateral motion of the frayed cable scaling tool.

17. A frayed cable scaling tool comprising a first cable, the first cable having a frayed end, a second cable, a collar that prevents the frayed end of the first cable from unraveling more than is desired, and the collar also is a splice that attaches the first cable to the second cable.

18. The frayed cable scaling tool of claim 17 in which the first cable and the second cable are of the same material.

19. The frayed cable scaling tool of claim 17 in which the first cable and the second cable are of different materials.

20. The frayed cable scaling tool of claim 17 further comprising a guide tube enclosing at least a part of the frayed cable scaling tool.

* * * * *